(12) United States Patent
Girten

(10) Patent No.: US 6,783,431 B2
(45) Date of Patent: Aug. 31, 2004

(54) JOINT FORMING TOOL AND METHOD

(76) Inventor: Michael Girten, 548 W. Main St., Florence, CO (US) 81226

( * ) Notice: Subject to any disclaimer, the term of this patent is extended or adjusted under 35 U.S.C. 154(b) by 73 days.

(21) Appl. No.: 10/092,123

(22) Filed: Mar. 6, 2002

(65) Prior Publication Data

US 2003/0171073 A1 Sep. 11, 2003

(51) Int. Cl.[7] ................................................. B24B 1/00
(52) U.S. Cl. ......................................... 451/28; 451/508
(58) Field of Search ................................ 451/267, 259, 451/278, 341, 340, 502, 521, 522, 490, 493, 508, 510, 496, 344, 410, 525, 555, 28

(56) References Cited

U.S. PATENT DOCUMENTS

| | | |
|---|---|---|
| 569,235 A | 10/1896 | Rockwell |
| 1,048,957 A | 12/1912 | Graham |
| 1,924,958 A | 8/1933 | Patterson |
| 1,991,834 A | 2/1935 | Albertson |
| 2,005,851 A | 6/1935 | Albertson |
| 2,084,175 A | 6/1937 | Zimmerman |
| 2,203,143 A | 6/1940 | Hass |
| 2,363,102 A | 11/1944 | Wachowitz |
| 2,394,882 A | 2/1946 | Weynand |
| 2,702,926 A | 3/1955 | Rahaim |
| 2,728,174 A | 12/1955 | Mastrandrea |
| 2,754,642 A | 7/1956 | Soulet |
| 2,993,311 A | 7/1961 | West |
| 3,059,291 A | 10/1962 | Sherwood |
| 3,405,592 A | 10/1968 | Blodge |
| 3,942,289 A * | 3/1976 | Greer .......................... 451/430 |
| 4,156,326 A * | 5/1979 | Frost, Jr. ..................... 451/430 |
| 4,205,493 A | 6/1980 | Kim |
| 4,420,908 A | 12/1983 | Reiling et al. |
| 4,692,958 A * | 9/1987 | McMakin ................ 15/230.12 |
| 4,729,698 A | 3/1988 | Haddon |
| 4,972,589 A | 11/1990 | Povleski |
| 5,020,280 A | 6/1991 | O'Reilly |
| 5,131,783 A | 7/1992 | Astl |
| 5,201,785 A * | 4/1993 | Nagano ....................... 451/508 |
| 5,564,969 A | 10/1996 | Tsang |
| 5,584,753 A | 12/1996 | Takahashi |
| 6,394,887 B1 * | 5/2002 | Edinger ....................... 451/494 |

* cited by examiner

*Primary Examiner*—Dung Van Nguyen
(74) *Attorney, Agent, or Firm*—Ramon L. Pizarro; Edwin H. Crabtree

(57) ABSTRACT

A tool for finishing surfaces to be joined together. The tool includes a support wheel with a lower surface with a generally flat surface and a central axis that is generally normal to the flat surface of the lower surface. The generally flat surface of the lower surface being adapted for supporting a section of snadpaper or the like. The tool also includes a guide axle that extends from the flat surface of the lower surface and along the central axis of the support wheel and a drive axle that extends from the upper surface of the support wheel and along the central axis of the support wheel, so that the support wheel driven through the drive axle supports the sandpaper against the surfaces to be joined as the guide axle is inserted into the aperture in the surfaces to be joined.

17 Claims, 2 Drawing Sheets

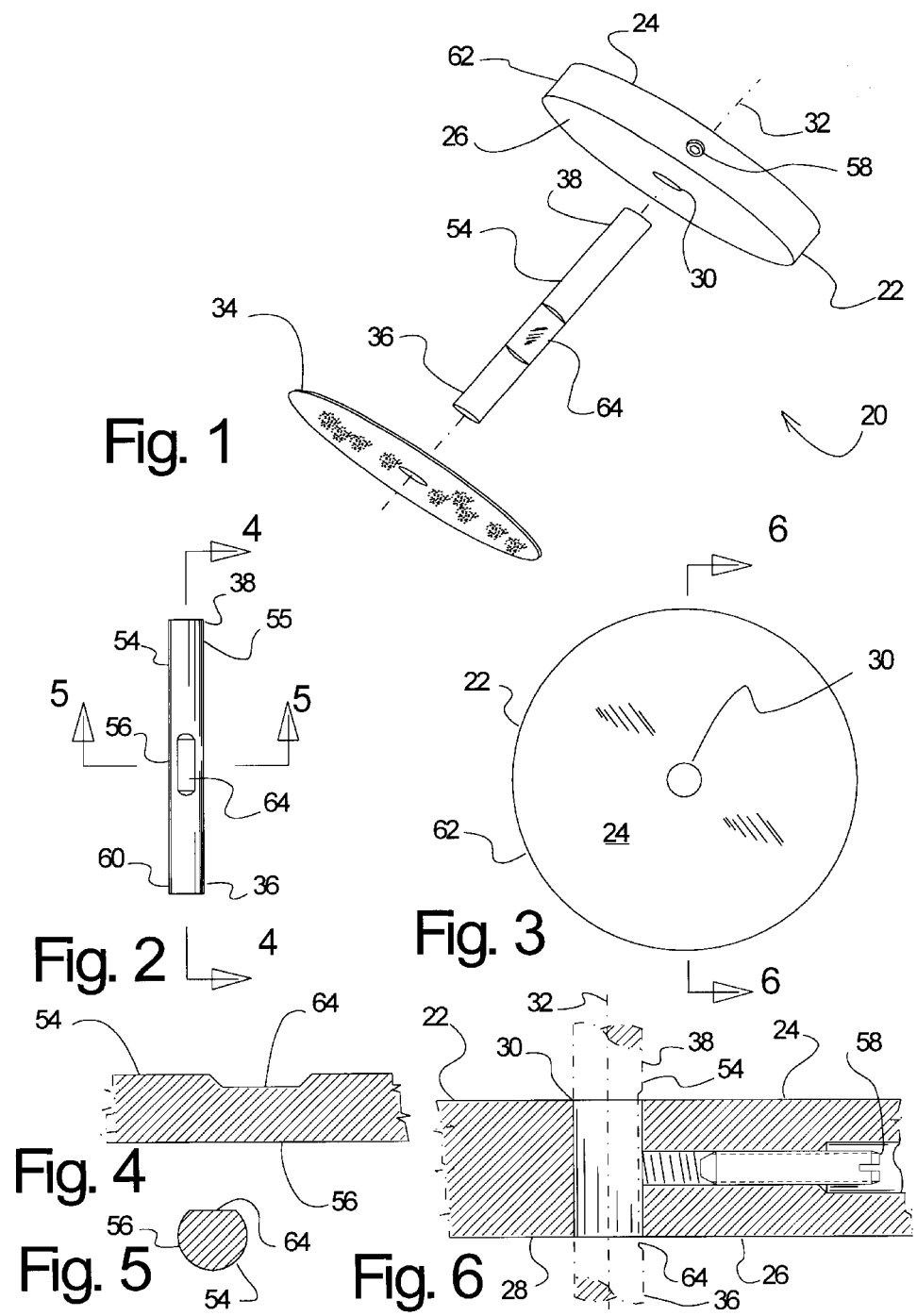

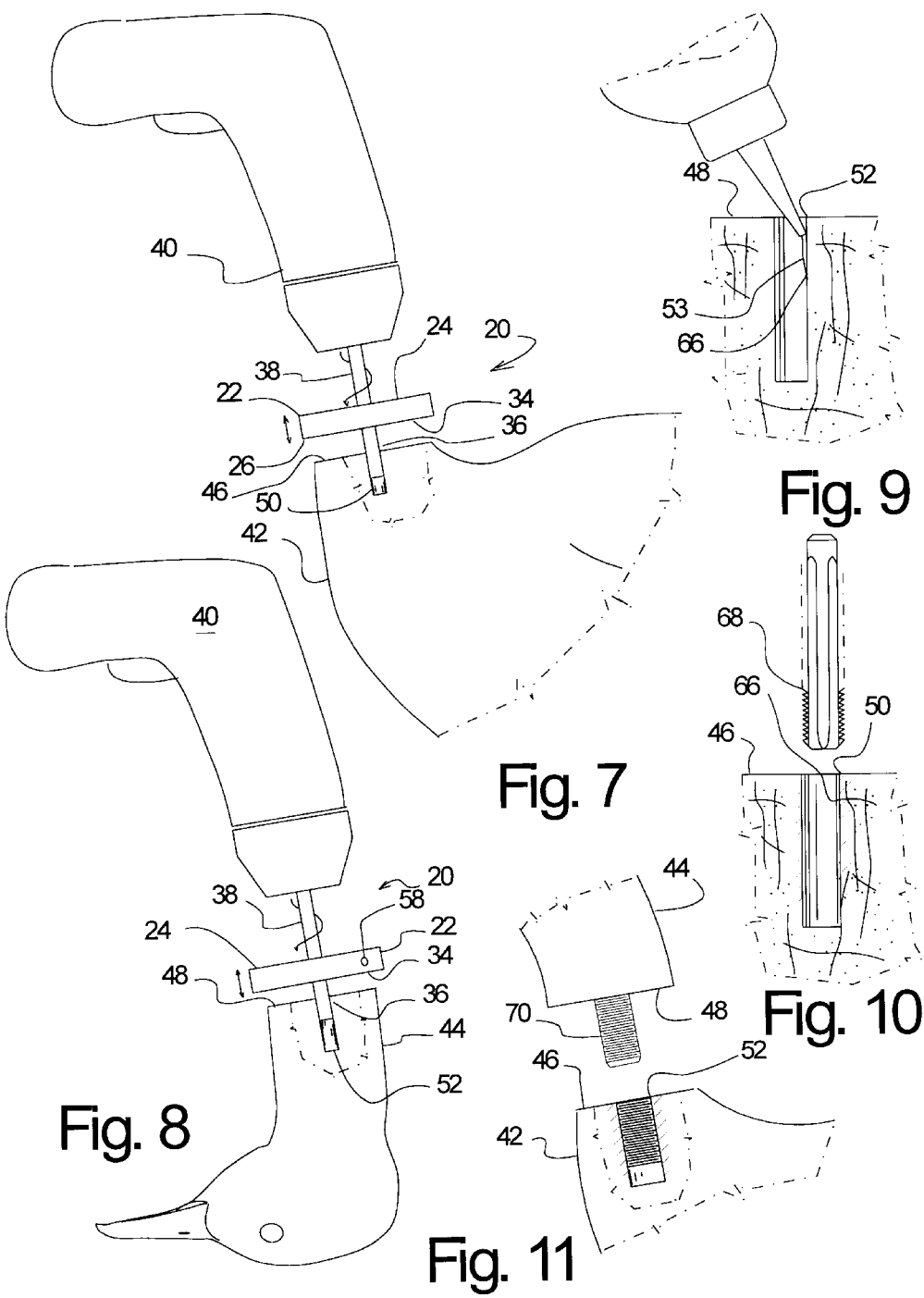

JOINT FORMING TOOL AND METHOD

BACKGROUND OF THE INVENTION (a) Field of the Invention

This invention generally relates to a tool and method for preparing surfaces to be joined together. More particularly, but not by way of limitation, to a tool and method for preparing flat surfaces in wood components to be joined together.

(b) Discussion of Known Art

To assemble wood components together it is customary to first prepare the mating surfaces so that they will be somewhat parallel to one another, and then to insert an axial retainer such as a dowel into the mating surfaces by way of alignment holes which have been drilled into the surfaces. The dowel and the mating surfaces are typically held together with the use of an adhesive.

As described above, the general process for joining two components, or creating a joint, is fairly uncomplicated. However, a persistent problem associated with the forming of these joints has been that existing tools have met limited success in the preparation of the joint surfaces prior to the joining of one surface against the other. For example, if one component is to be joined to another component, the mating surfaces are prepared so that once joined together the balance of the components remain at the desired angles or orientation relative to one another. To solve this problem, joining tools which consist of clamps that hold the components at a desired orientation relative to one another are frequently used. These joining tools, however, hold the mating surfaces of the joined components at whatever position necessary relative to one another to achieve the desired orientation of the components. This frequently results in the creation of large, unsightly, gaps between the mating surfaces. The gaps must then filled with compositions which are used to try to blend the physical appearance of the components to conceal the lack of precision of the mating surfaces.

The concealment of gaps with compositions which imitate the adjoining wood components can produce a somewhat unsightly appearance in components where the wood grain is to play a significant role in the overall appearance of the finished assembly. For example, in the joining of two components in the making a decoy, or other wood sculpture, it is highly desirable to prepare the mating surfaces such that the joined assembly requires little or no filling to conceal gaps.

Known tools and components which can be used to prepare joints can be found in U.S. Pat Nos. 5,131,783 to Astl, 4,972,589 to Povleski, 4,729,698 to Haddon, 3,059,291 to Sherwood, 3,405,592 to Blodee, 2,702,926 to Rahaim, and 569,235 to Rockwell. Patents which illustrate tools for preparing surfaces to be joined together can be bound in U.S. Pat Nos. 4,420,908 to Reiling et al. and 4,205,493 to Kim.

A study of these known solutions brings to light that there remains a need for a tool that allows the user to prepare surfaces of components to be joined, so that upon joining of the two surfaces, the components remain at a desired orientation relative to one another, and so that the joint results in few if any gaps between the surfaces to be joined.

There remains a need for a tool that would allow woodworker to create joint surfaces that are parallel to one another when the components to be joined are at the desired orientation to one another.

There remains a need for a tool and a method of creating virtually seamless, sturdy joints; particularly joints used in connecting components made from porus materials such as wood or similar materials.

SUMMARY

It has been discovered that the problems left unanswered by known art can be solved by providing a joint preparation tool which includes:

1) a support wheel which has a substantially flat surface adapted for supporting a material which serves for working, or flattening the surfaces to be joined;
2) a guide axle extending from the flat surface of the support wheel; and
3) a drive axle extending from the support wheel on a side that is opposite to the side of the support wheel which includes the guide axle.

It has been discovered that with the disclosed tool exceptionally well fitting joints can be made by craftsmen with even very little skill. To use the tool, the craftsman first drills a hole into the components to be joined. These holes should be along a line that is substantially parallel to the desired final orientation of the assembled components. The user then simply connects the drive axle to a power tool or other drive mechanism, and then inserts the guide axle into the holes made in the components to be joined. The support wheel is then turned and pressed against the component to be joined so that the material for working a surface mounted on the lower surface of the support wheel works, or grinds and sands down, the area around the holes on the components to be joined. This sanding down or working of the area results in the shaping of the area around the hole to conform with the shape of the support wheel. In a highly preferred embodiment of the invention the lower surface of the support wheel is flat, which creates a flat surface around the hole. In a highly preferred embodiment of the invention the lower surface is normal to the guide axle. This configuration results in forming a surface that is substantially normal to the hole drilled in the component to be joined.

According to a highly preferred embodiment of the invention the support wheel is a disk a flat upper surface and a flat lower surface, each of the surfaces being parallel to one another. The disk includes a cylindrical perimeter and an aperture that is normal to the upper surface and the lower surface and extends through the center of the upper surface and the center of the lower surface. Preferably, the guide axle and the drive axle are formed on a shaft which adapted for insertion through the aperture in the support wheel. The shaft and the aperture through the support wheel will be of approximately the same size. Additionally, a retainer, such as a set-screw or the like, will be used to retain the shaft against the support wheel.

The disclosed invention will preferably be used for carry out a method for creating a joint consisting of at least two surfaces.

The method will use the disclosed tool for contacting and preparing a surface around the aperture in the components to be joined. Additional steps which provide important new and useful results includes the hardening the sidewalls of the hole in the components to be joined by adding a liquid adhesive to the sidewalls. After the adhesive has hardened the sidewalls, it is contemplated that the sidewalls may be then tapped to incorporate threads into the sidewalls to allow connection of the two components by way of a threaded connector.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 1 is a perspective of the components of a highly preferred embodiment of a joint forming tool made in accordance with the disclosed invention.

FIG. 2 is an elevational view of a shaft made for use with the disclosed invention.

FIG. 3 is a top, plan view of a highly preferred embodiment of a support wheel made in accordance with the disclosed invention.

FIG. 4 is a sectional view taken at the location indicated on FIG. 2.

FIG. 5 is a sectional view taken at the location indicated on FIG. 2.

FIG. 6 is a sectional view taken at the location indicated on FIG. 3.

FIG. 7 is a side view of the tool in use while preparing a surface on one component, the body of a decoy, to be joined to another component, the head of the decoy. The view includes a breakout section which illustrates the use of the guide axle of the tool.

FIG. 8 is a side view of a neck and head component being prepared for mounting on the body illustrated on FIG. 7. The view also includes a breakout section to better illustrate the use of the tool.

FIG. 9 illustrates the addition of a hardening liquid, such as a polymer resin, to the sides of a hole of a component to be joined to another component.

FIG. 10 illustrates the step of using a tap to cut threads into the treated sides of the hole of the component to be joined.

FIG. 11 illustrates the use of a threaded connector to join the two components after thread has been cut into one or both of the components.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Turning now to FIG. 1 where a tool 20 for finishing at least two surfaces to be joined together has been illustrated. In a highly preferred embodiment of the invention the tool 20 includes a support wheel 22 which includes an upper surface 24, a lower surface 26, which has a generally flat surface 28. The support wheel 22 will preferably include an aperture 30 that extends through the support wheel 22 along a central axis 32 of the support wheel 22. In a highly preferred embodiment of the invention the central axis 32 is generally normal, or perpendicular, to the flat surface 28 of the lower surface 26.

Also illustrated on FIG. 1 is that the lower surface 26 has been adapted for receiving a means for working a surface, which in a preferred embodiment is a sheet of adhesively backed sand paper 34.

Referring now to FIGS. 1, 7 and 8, it will be understood that a highly preferred embodiment of the tool 20 will include a guide axle 36 and a drive axle 38. The drive axle 38 has been adapted for attachment to a rotating drive means, such as a power drill 40 or the like. The guide axle 36 serves as a guide for maintaining the support wheel 22 at a desired orientation to the components to be joined, which in the exemplar illustration include the body 42 of a decoy and the neck and head 44 of the decoy.

To properly join the neck and head 44 of the decoy to the body 40 of the decoy, it is highly desirable to provide mating surfaces 46 and 48 which are substantially perpendicular to the desired final orientation of the neck and head 44 to the body 42. Additionally, it is highly desirable to provide a flat, even contour or surface finish to each of the mating surfaces 46 and 48. By providing smooth or flat, even surfaces prior to joining the mating surfaces 46 and 48, one achieves a joint which is very difficult to detect, and which will reveal few if any cracks or joint lines which must then be filled to provide a smooth external contour to the joint.

The disclosed tool 20 will allow the user to create mating surfaces 46 and 48, which will join to produce components that remain at the desired angle relative to one another, by working, or sanding and removing material from the components to be joined. To produce these surfaces, the user would first drill holes 50 and 52 which are parallel to a line or axis along which is parallel to a line which represents the desired orientation of the components once joined. It is preferred that the holes 50 and 52 will be of a diameter which is slightly larger than the diameter of the guide axle 36.

As illustrated in FIGS. 7 and 8, the mating surfaces are prepared around the holes 50 and 52 by inserting the guide axle 36 into the each of the holes 50 and 52 to work away or remove material from around the holes 50 and 52 in the components to be joined to produce the mating surfaces 46 and 48. Thus, to ensure that the mating surfaces 46 and 48 are at the desired, right angles, it is advantageous to ensure that the holes 50 and 52 are approximately the same size or diameter as the guide axle 36. This is because the guide axle 36 will slide into and cooperate with the holes 50 and 52 to ensure that the lower surface 26 of the support wheel is used to remove material from the components to be joined. Thus, the close fit of the guide axle 36 into the holes 50 and 52 ensures control over the finished mating surfaces 46 and 48.

Referring once again to FIG. 1, it will be understood that in a highly preferred embodiment of the invention the guide axle 36 and the drive axle 38 are produced by providing a shaft 54 which has been adapted for insertion through the aperture 30 in the support wheel 22. The shaft 54 will include a first end 55 which will define the guide axle 36 once the shaft 54 has been inserted through the support disk 22. The shaft 54 will also include a mid-portion 56 having means for retaining the shaft against the support wheel 22. In a highly preferred embodiment of the invention, these means for retaining include a set screw 58 which will be described in greater detail in conjunction with FIG. 6. The shaft 54 will also include a second end 60 which will define the drive axle 38 once shaft 54 has been inserted through the aperture 30 in the support wheel 22 and retained against the support wheel as shown in FIGS. 7 and 8.

Referring now to FIGS. 1, 3, and 6 it will be understood that in a highly preferred embodiment of the invention it is desired that the upper surface 24 of the support wheel 22 be substantially flat and parallel to the lower surface 26. Additionally, the upper surface 24 and the lower surface 26 will be separated by a distance which takes form as the sides 62 of the support wheel 22. As illustrated, in a highly preferred embodiment of the sides 62 will be cylindrical in shape.

FIGS. 1, 2, 4, 5, and 6 illustrate that a highly preferred embodiment of the shaft 54 will include a flat area or discontinuity 64 that will cooperate with the set screw 58 to retain the shaft 54 at a desired location relative to the aperture 30 in the support wheel 22. The set screw 58 will preferably be driven in from the sides 62 of the support wheel 22. Additionally, it is preferred that the size, or diameter beyond the discontinuity 64 of the mid-portion 56 will be approximately equal to the size or proportions of the aperture 30 in the support wheel 22. This will allow the aperture 30 to cooperate with the shaft 54 to maintain the shaft 54 at a substantially perpendicular orientation relative to the lower surface 26 of the support wheel 22, as illustrated in FIGS. 7 and 8.

It is important to note that the setscrew 58 serves as a means for engaging the means for retaining the shaft against said support wheel 22. The means for retaining the shaft 54 against the support wheel 22 may be an enlarged portion on the shaft 54 or other discontinuity, like the discontinuity 64.

The drilling and use of guide holes 50 and 52 allow the user to take advantage of the existence of these holes for the preparation of the mating surfaces 46 to incorporate an axial elongated connector, such as a dowel, into the joint. Additionally, referring to FIGS. 9–11 it will be understood that the guide holes 50 and 52 can be reinforced by the worker or craftsman. Particularly, when working with porus materials, such as wood, it has been discovered that it is advantageous to expose the sides 66 of the guide holes 50 or 52 to a hardening material 53 such as a glue or penetrating polymer. Once the hardening material permeates the sides 66 and hardens, then a thread making apparatus, such as a tap 68 may be used to provide threads along the sides 66 of the holes 50 and 52. Then, a threaded fastener 70 may be used to join the two components along the mating surfaces 46 and 48. It is important to note that while it is contemplated that a threaded fastener 70 may be used to allow separation of the joined components as desired, it is also contemplated that the joint may be made permanent by the addition of a wood glue or other adhesive, and the threaded fastener 70 used as a clamp to hold the components together while the glue cures.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A tool for finishing surfaces to be joined together, the surfaces to be joined having an aperture that extends generally orthogonally into the surfaces to be joined, the tool comprising:

a support wheel having an upper surface, a flat lower surface, the support wheel further having an aperture extending through said support wheel from said upper surface to said lower surface along a central axis that is generally normal to the flat lower surface, the generally flat lower surface being adapted for supporting a surface working means, the upper surface and the flat lower surface being bounded by a cylindrical surface;

a shaft comprising a guide axle portion, a drive axle portion and means for retaining the shaft against said support wheel, the means for retaining the shaft against said support wheel being located between the guide axle portion and the drive axle portion, the guide axle portion extending through the support wheel from the flat lower surface and along the central axis of said support wheel, the drive axle portion extending from the upper surface of said support wheel and along the central axis of said support wheel, the flat lower surface extending from the guide axle to the cylindrical surface, so that the support wheel driven through the drive axle supports the surface working means against the surfaces to be joined as the guide axle is inserted into the aperture in the surface to be joined.

2. A tool according to claim 1 wherein said means for retaining the shaft against the wheel comprises means for limiting the insertion of said axle through said aperture in said support wheel.

3. A tool according to claim 1 wherein said support wheel further comprises means for accepting a set screw to secure the support wheel against the shaft.

4. A tool for finishing at least two surfaces to be joined together with an axial connector inserted into an aperture that extends generally orthogonally into the surfaces to be joined, the axial connector remaining at a generally normal orientation to the surfaces, the surfaces to be finished with a surface working means, the tool comprising:

a support wheel having an upper surface, a lower surface having a generally flat surface and an aperture extending through said support wheel along a central axis that is generally normal to the flat surface of the lower surface, the generally flat surface of the lower surface being adapted for supporting the surface working means, the flat surface of the lower surface extending in a coplanar manner from the aperture extending through said support wheel to the cylindrical surface;

a shaft adapted for insertion through the aperture in said support wheel, the shaft having a first end defining a guide axle, a mid-portion having means for retaining the shaft against said support wheel and a second end defining a drive axle, so that when said shaft is inserted through the aperture in said support wheel and retained against the support wheel the drive shaft portion extends from the upper surface of said support wheel and along the central axis of said support wheel, and so that the guide shaft portion extends from the flat surface of the lower surface and along the central axis of said support wheel, so that the support wheel driven by means of the drive axle supports the surface working means against the surfaces to be joined as the guide axle is inserted into the aperture of the axial connector.

5. A tool according to claim 4 wherein the mid-portion of said shaft includes a surface of a size that is approximately equal to the size of the aperture in said support wheel, so that the aperture cooperates with the shaft to maintain the shaft at a substantially perpendicular orientation relative to the lower surface of said support wheel.

6. A tool according to claim 4 wherein said mid-portion of said shaft includes a discontinuity and said support wheel includes means for engaging the discontinuity on said shaft, so that the position of said shaft relative to said support wheel is fixed when said means for engaging the discontinuity on the shaft contacts said discontinuity on said shaft.

7. A tool according to claim 4 wherein the upper surface of said support wheel is substantially parallel to the flat surface of said lower surface.

8. A tool according to claim 7 wherein said support wheel further comprises a cylindrical surface extending between and around said upper surface and said lower surface.

9. A tool according to claim 8 and further comprising means for engaging the means for retaining the shaft against said support wheel, the means for engaging being mounted on the cylindrical surface of said support wheel.

10. A tool according to claim 4 wherein said mid-portion of said shaft is of approximately the same configuration as the aperture in said support wheel, so that the aperture in said support wheel cooperates with the mid-portion of the shaft to maintain the guide axle portion of said shaft at a substantially perpendicular orientation relative to the lower surface of the support wheel.

11. A method for creating a joint consisting of at least two surfaces, the method comprising:
providing a first component having a surface having an aperture;
providing a second component having a surface having an aperture; providing a tool having:
a support wheel having an upper surface, a lower surface that is flat, and a central axis that is generally normal to the flat lower surface, the generally flat surface of the lower surface having a surface working means;
a guide axle extending from the flat lower surface and along the central axis of said support wheel; and a drive axle extending from the upper surface of said support wheel and along the central axis of said support wheel;
contacting and preparing a surface around the aperture of the first component with the surface working means by inserting the guide axle into the aperture of the first component until the surface working means on the support wheel contacts the first component;
contacting and preparing a surface around the aperture of the second component with the surface working means by inserting the guide axle into the aperture of the second component until the surface working means on the support wheel contacts the second component; and
joining the surface around the aperture in the first component against the surface around the aperture in the second component by placing the aperture of the first component in alignment with the aperture of the second component, so that the first component and the second component contact one another.

12. A method according to claim 11 and further comprising the step of inserting an elongated connector in the aperture in the first component, and then inserting the elongated connector in the aperture in the second component.

13. A method according to claim 11 wherein the aperture of the first component includes porous sidewalls, and the method further comprising hardening the sidewalls of the aperture of the first component by adding a liquid adhesive to the sidewalls.

14. A method according to claim 13 wherein the aperture of the second component includes porous sidewalls, and the method further comprising hardening the sidewalls of the aperture of the second component by adding a liquid adhesive to the sidewalls.

15. A method according to claim 14 and further comprising tapping the sidewalls of the aperture of the second component.

16. A method according to claim 15 and further comprising providing a threaded connector, inserting the threaded connector into the aperture of the first component and joining the first component to the second component by means of the threaded connector.

17. A method according to claim 13 and further comprising tapping the sidewalls of the aperture of the first component.

* * * * *